No. 778,859. PATENTED JAN. 3, 1905.
J. O. HOBBS.
REVERSING AND VARIABLE SPEED GEAR.
APPLICATION FILED DEC. 18, 1903.
2 SHEETS—SHEET 1.
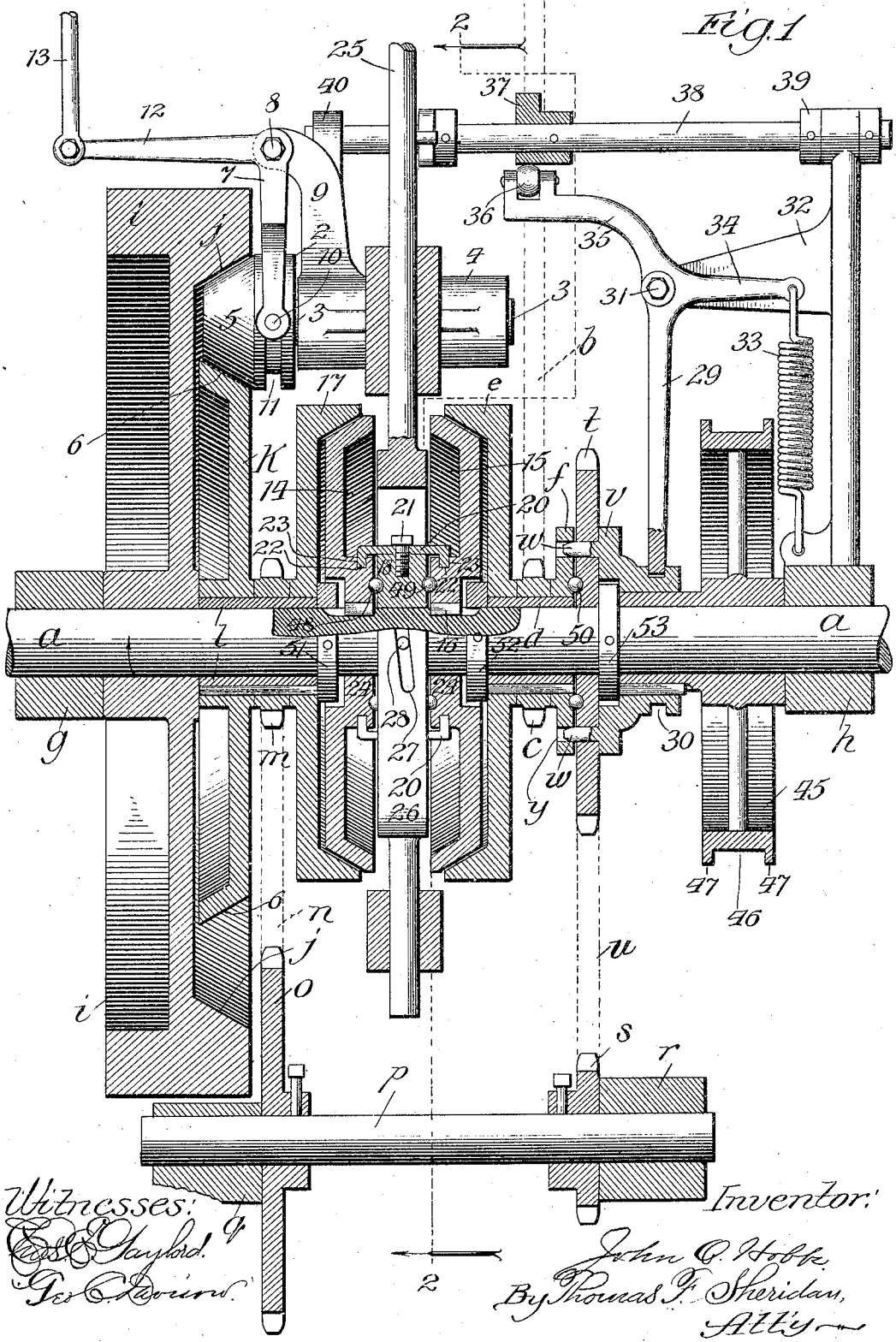

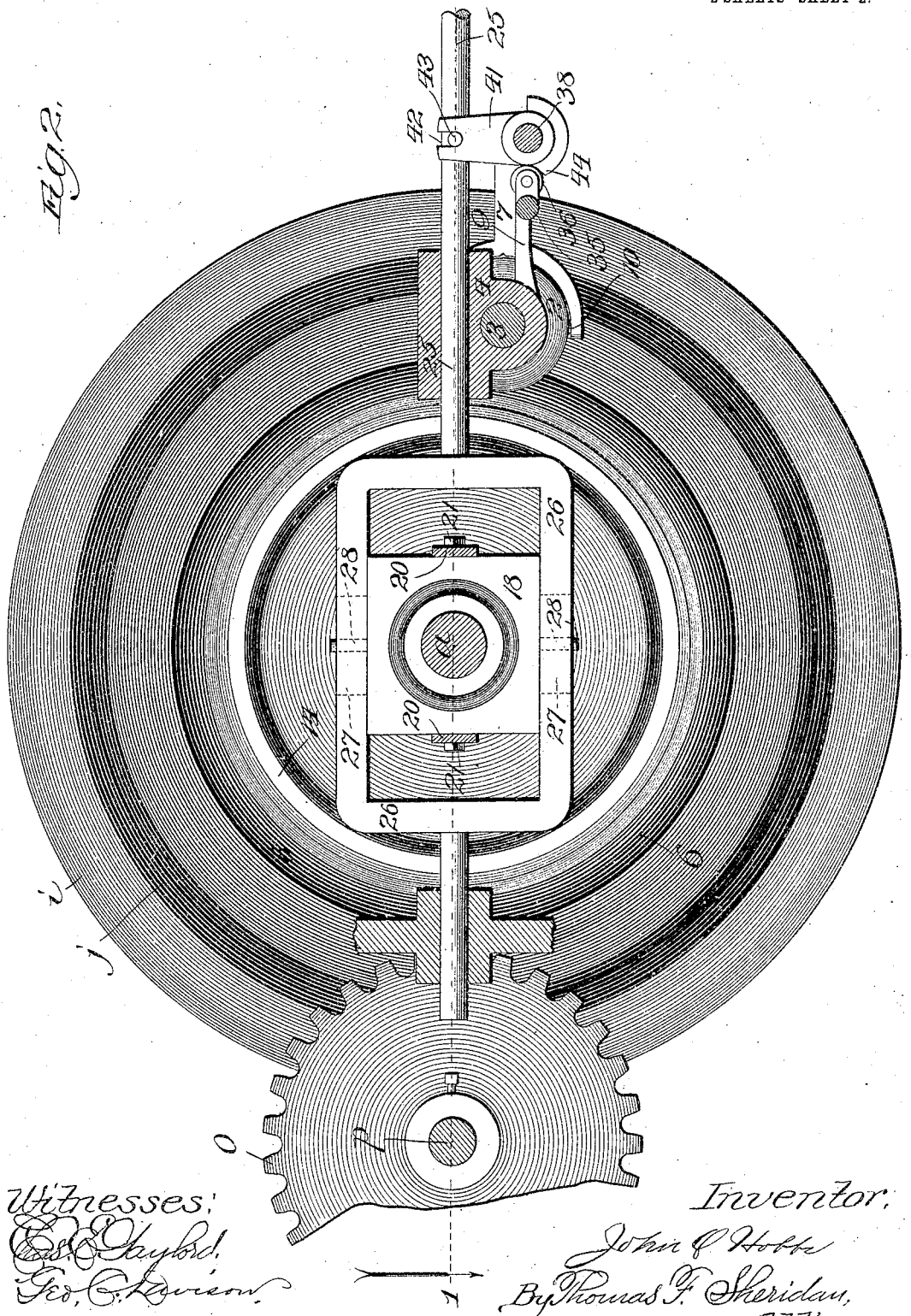

No. 778,859.

Patented January 3, 1905.

UNITED STATES PATENT OFFICE.

JOHN O. HOBBS, OF CHICAGO, ILLINOIS.

REVERSING AND VARIABLE-SPEED GEAR.

SPECIFICATION forming part of Letters Patent No. 778,859, dated January 3, 1905.

Application filed December 18, 1903. Serial No. 185,708. REISSUED

*To all whom it may concern:*

Be it known that I, JOHN O. HOBBS, a citizen of the United States, residing at Chicago, in the county of Cook and State of Illinois, have invented certain new and useful Improvements in Reversing and Variable-Speed Gears, of which the following is a specification.

My invention relates to that class of reversing and variable-speed gears having friction wheel and clutch mechanism mounted upon a main driving-shaft and reduction-gear mechanism adapted to be thrown into and out of operative engagement with the driving mechanism.

The principal object of my invention is to provide a simple, economical, and efficient reversing and variable-speed gear for vehicles.

A further object of the invention is to provide a gearing without cog-wheels adapted to provide a fast and relatively slow speed forward or a slow speed backward without changing the direction or speed of the main shaft.

A further object of the invention is to provide means whereby a fast and relatively slow speed forward and a rearward movement of the vehicle may be obtained without changing the direction or speed of rotation of the main driving-shaft and enabling all cog-wheel mechanisms for such purpose to be dispensed with, either the fast or slow movement forward being obtained by a single movement of the same operating-lever.

Other and further objects of the invention will appear from an examination of the drawings and the following description and claims.

In the accompanying drawings, Figure 1 is a diagrammatic plan view of a gear mechanism constructed in accordance with my improvements, and Fig. 2 a view in elevation taken on line 2 of Fig. 1 looking in the direction of the arrow.

In illustrating and describing my invention I have shown and described only such parts as are new, together with so much that is old and well known in the art as is necessary to enable those skilled in the art to make and practice the invention, leaving out of consideration old and well-known elements, which it is deemed unnecessary to describe here.

The invention as herein illustrated and described is adapted to be used in connection with automobiles.

In constructing a reversing and variable-speed gearing in accordance with my improvements I provide a main driving-shaft $a$, which in the mechanism herein illustrated is the engine-shaft of an automobile. Mounted upon this shaft and at all times connected, by means of a chain $b$ or any ordinary and well-known mechanism, with the main driving sprocket and axle, and thereby with the driving-wheels of the vehicle, is a sprocket-wheel $c$. It is rotatably mounted upon the main driving-shaft by means of a sleeve $d$, which encircles the shaft and which may be integral with the sprocket-wheel, though I prefer to make such sleeve a separate piece keyed or otherwise firmly attached to the sprocket-wheel. A friction clutch member $e$ is also mounted upon this sleeve, and thereby firmly connected to the sprocket-wheel and rotatable upon the driving-shaft, and a slotted clutch member $f$ is mounted opposite the friction clutch member upon the same sleeve in fixed relation to the sprocket. The main driving-shaft is mounted in suitable bearings $g$ and $h$, and a combined fly-wheel and friction-wheel $i$ is mounted upon and rotatable with such main driving-shaft and provided at one side with an inclined friction-surface $j$, and a friction-wheel $k$ is mounted upon and in fixed relation to a sleeve $l$, which encircles the main driving-shaft and which is rotatable with relation to such shaft. A sprocket-wheel $m$ is also mounted upon this sleeve and in fixed relation thereto, so that it may be rotated in either direction with relation to the main driving-shaft, and this sprocket is operatively connected with the loose sprocket $c$, already described, for the rearward and slow forward movements, by means of reducing-gear mechanism comprising a sprocket-chain $n$, a relatively large sprocket $o$, which is mounted upon a shaft $p$, journaled in suitable bearings $q$ and $r$, a sprocket $s$, preferably smaller in diameter than the sprocket $o$, and a sprocket $t$, which is rotatably mounted upon the main driving-shaft adjacent to the slotted clutch member, already described, and which last-mentioned sprocket is preferably relatively larger than the sprocket $s$ and is connected thereto by means of a chain $u$. The sprocket-wheel $t$ is connected with the sprocket $c$ when desired, so as to cause it to rotate therewith. This is accomplished by means of a pin-clutch $v$, rotatably mounted on or in movable relation to the driving-shaft by means of a sleeve to which such clutch is splined, so as to be slidable longitudinally thereof. The clutch member is provided with pins $w$, which are movable into and out of engagement with slots $y$ in the slotted clutch member $f$.

A friction-wheel 2 is mounted upon the end of a longitudinally movable and rotatable shaft 3, which is journaled in a suitable bracket 4, such friction-wheel being provided with an inclined or conical friction-surface 5, adapted to be moved into and out of engagement with the adjacent friction-surfaces of the friction-wheel $k$ and the fly-wheel, whereby when such parts are in engagement the friction-wheel $k$ will be caused to rotate in the opposite direction to the main driving-shaft and fly-wheel, and the connecting reducing-gear mechanism will accordingly cause the rotation of the sprocket $c$ in the opposite direction to such drive-wheel and the consequent backward movement of the vehicle at a slow speed relative to the speed of rotation of the main driving-shaft.

To provide means for moving the friction-wheel 2 into and out of engagement with the adjacent friction-wheels above described, a bell-crank lever 7 is pivotally mounted, by means of a pivot 8, upon an arm 9 of the bracket 4, already described, and the swinging end of such lever nearest the friction-wheel is provided with a suitable pin 10, which is mounted in an annular slot 11 in the periphery of such friction-wheel, the opposite arm 12 of such bell-crank lever being provided with a suitable operating-lever 13, connected thereto and which may be of any ordinary and well-known type. Although I have shown a bell-crank lever as a means by which this friction-wheel may be operated, it will of course be understood that any known equivalent of such mechanism may be employed in lieu thereof without departing from the spirit of my invention. By this arrangement it will be seen that when the pin-clutch $v$, already described, is in the position shown in Fig. 1, the driving-shaft rotating in the direction of the arrow, the friction-wheel 2 when thrown into engagement with the adjacent friction-wheels above described will cause the rearward movement of the vehicle at a slow rate of speed relative to the speed of rotation of the main driving-shaft. In order to provide means for moving the vehicle forward at a similar rate of speed when desired or at a more rapid speed relative to the speed of rotation of the main driving-shaft when desired, two friction clutch members 14 and 15 are mounted upon the shaft and connected thereto by means of suitable splines 16, so as to permit them to slide longitudinally of and rotate with the shaft. The clutch member 14 is adjacent to a female clutch member 17. The latter being mounted upon the sleeve $l$ is at all times rotatable with the sprocket $m$, which is at all times connected with the reducing-gears. Therefore when the clutch members 14 and 17 are in engagement the "slow forward" movement of the vehicle is produced. The clutch member 15 is adjacent to the female clutch member $e$, already described, and is adapted to be thrown into engagement therewith to produce the fast forward movement. In order to provide means for operating these splined clutch members, a sliding block 18 is loosely and slidably mounted upon the main driving-shaft, such sliding block being provided with connecting metallic straps 20, attached thereto by means of threaded screws 21 and having their angular ends 22 in engagement with annular slots 23 in the hubs 24 of the splined friction clutch members. An operating rod or shaft 25 is provided with a central looped portion 26, the opposite sides of which extend in sliding engagement with the opposite sides of the sliding block, and each side of this loop is provided with an inclined slot 27, which engages a pin 28 on the sliding block and extending into sliding engagement with the walls of such slot. By this arrangement it will be seen that the movement of the operating rod or shaft downward from the position shown in Fig. 1 will cause the friction clutch member 14 to engage the clutch member 17 and that when such members are in contact and the pin clutch member $v$ is in the position shown in Fig. 1 a slow forward movement of the vehicle will be produced. In order to produce the fast forward movement, it becomes necessary to move the pin clutch member to the right of the position shown in Fig. 1, so that the pins are not in engagement with the slotted clutch member $f$ and that immediately thereafter or simultaneously the friction clutch member 15 be thrown into engagement with the adjacent clutch member $e$, already described, so that both of such clutch members and the sprocket-wheel $c$ will rotate in the same direction and at the same speed with the main driving-shaft. In order to accomplish this by means of one movement of the operating-rod, (in an upward direction from the position shown in Fig. 1,) a bell-crank lever 29 is mounted with the swinging end nearest the pin clutch member in engagement with an annular slot 30 in such clutch member. This bell-crank lever is pivotally mounted, by means of a pivot-pin 31, upon a suitable bracket 32 and is moved into and held in the position shown in Fig. 1 (so that the pin-clutch is in engagement with the slotted clutch member) by means of a spring 33, which is attached to an arm 34 of such lever. An operating-arm 35 of the lever is provided with an antifriction-wheel 36, adjacent to and in engagement with an operating-cam 37, which is mounted upon a shaft 38, rotatably mounted in suitable bearings 39 and 40 and at right angles to the operating-rod 25, already described. The cam-bearing shaft is provided with a connecting-lever arm 41, having a slot 42 in its swinging end for receiving a pin 43, with which the operating-rod is provided, and it will be readily seen that the movement of the operating-rod upward from the position shown in Fig. 1 will cause the cam-shoulder 44 to move the bell-crank lever, which is in engagement with the pin clutch member, in the direction necessary to free the slotted clutch member $f$ and sprocket $c$ and permit such parts to rotate independently of the sprocket $t$ and reducing-gear mechanisms. By this arrangement the movement of the operating-rod 25 upward from the position shown in Fig. 1 first operates the bell-crank lever, so as to throw the pin-clutch out of engagement with the sprocket clutch member and sprocket $c$, and immediately upon such parts becoming disengaged the friction clutch member 15 is thrown by the same movement of the operating-rod into engagement with the clutch member $e$, and the fast forward movement of the vehicle is thus obtained.

Ball-bearings 48 and 49 are provided between the sliding block and the splined friction clutch members upon each side of such block, and similar ball-bearings 50 are mounted between the slotted clutch member above described and the sprocket-wheel $t$. Collars 51, 52, and 53 are mounted upon the main driving-shaft in fixed relation thereto and serve to hold the sprocket-wheels and clutch mechanisms in their proper positions longitudinally of such shaft.

In order to provide means for forming a suitable brake, a friction or brake wheel 45 is mounted upon the main shaft in movable relation thereto and rotatable with the clutch member $v$. This friction or brake wheel is provided with a peripheral slot 46 between annular shoulders or flanges 47, in which is mounted the ordinary friction-strap, which is well known to those skilled in the art and which with its operating mechanism therefore need not be described here.

I claim—

1. In a mechanism of the class described, the combination of a main driving-shaft, a pair of sprocket-wheels mounted upon and rotatable with relation to such driving-shaft, gear mechanism connected with one of such sprocket-wheels and adapted to be connected to and disconnected from the other sprocket-wheel, a friction clutch member connected to each of such sprocket-wheels and rotatable therewith independently of each other, two friction clutch members splined to the driving-shaft between such sprocket-wheels and their attached friction clutch members, a sliding block mounted upon the shaft between such splined friction clutch members rotatable with relation to the shaft and slidable longitudinally thereof, and means for moving such sliding block and thereby the splined clutch members in either direction longitudinally of the shaft, substantially as described.

2. In a mechanism of the class described, the combination of a main driving-shaft, a pair of sprocket-wheels mounted upon and rotatable with relation to such driving-shaft, gear mechanism connected with one of such sprocket-wheels and adapted to be connected to and disconnected from the other sprocket-wheel, a friction clutch member connected to each of such sprocket-wheels and rotatable therewith independently of each other, two friction clutch members splined to the driving-shaft between such sprocket-wheels and their attached friction clutch members, a sliding block mounted upon the shaft between such splined friction clutch members rotatable with relation to the shaft and slidable longitudinally thereof, laterally-extending pins mounted on such sliding blocks, and an operating-rod provided with a looped portion in sliding engagement with the sliding block and having diagonal slots in each side of such looped portion for admitting the pins of the sliding block, substantially as described.

3. In a mechanism of the class described, the combination of a main driving-shaft, a pair of sprocket-wheels mounted upon and rotatable with relation to such driving-shaft, gear mechanism connected with one of such sprocket-wheels and adapted to be connected to and disconnected from the other sprocket-wheel, a friction clutch member connected to each of such sprocket-wheels and rotatable therewith independently of each other, two friction clutch members splined to the driving-shaft between such sprocket-wheels and their attached friction clutch members, a sliding block mounted upon such shaft between such splined clutch members rotatable with relation to the shaft and movable longitudinally thereof, ball-bearings mounted between such sliding block and the adjacent splined clutch members, means for connecting such splined clutch members, a pin mounted upon each side of the sliding block, and an operating-rod provided with a looped portion in sliding engagement with such sliding block and having diagonal slots in each side of such looped portion for admitting the pins of the sliding block, substantially as described.

4. In a mechanism of the class described, the combination of a main driving-shaft, a pair of sprocket-wheels mounted upon and rotatable with relation to such driving-shaft, a friction clutch member connected to each of such sprocket-wheels and rotatable therewith independently of each other, two friction clutch members splined to the driving-shaft between such sprocket-wheels and their attached friction clutch members, a sliding block mounted upon the shaft between such splined friction clutch members rotatable with relation to the shaft and slidable longitudinally thereof, means for moving such sliding block and thereby the splined clutch members in either direction longitudinally of the shaft, reducing-gear mechanism connected with one of such sprocket-wheels at all times and adapted to be connected to and disconnected from the other sprocket-wheel, and pin clutch mechanism for connecting the last-mentioned sprocket-wheel with the reduction-gear mechanism and disconnecting it therefrom, substantially as described.

5. In a mechanism of the class described, the combination of a main driving-shaft, a pair of sprocket-wheels mounted upon and rotatable with relation to such driving-shaft, a friction clutch member connected to each of such sprocket-wheels and rotatable independently of each other when desired, friction clutch mechanism splined to the driving-shaft and movable into and out of engagement with either of such independently-rotatable friction clutch members as desired, reducing-gear mechanism connected with one of such sprocket-wheels at all times and adapted to be connected to and disconnected from the other sprocket-wheel, and means for connecting the last-mentioned sprocket-wheel with the reduction-gear mechanism and disconnecting it therefrom, substantially as described.

6. In a mechanism of the class described, the combination of a main driving-shaft, a pair of sprocket-wheels mounted upon and rotatable with relation to such driving-shaft, a friction clutch member connected to each of such sprocket-wheels and rotatable independently of each other when desired, friction clutch mechanism splined to the driving-shaft and movable into and out of engagement with either of such independently-rotatable friction clutch members as desired, reducing-gear mechanism connected with one of such sprocket-wheels at all times and adapted to be connected to and disconnected from the other sprocket-wheel, and pin clutch mechanism for connecting the last-mentioned sprocket-wheel with the reduction-gear mechanism and disconnecting it therefrom, substantially as described.

7. In a mechanism of the class described, the combination of a main driving-shaft, a pair of sprocket-wheels mounted upon and rotatable with relation to such driving-shaft, a friction clutch member connected to each of such sprocket-wheels and rotatable independently of each other, friction clutch mechanism splined to the driving-shaft and movable into and out of engagement with either of such independently-rotatable friction clutch members as desired, reducing-gear mechanism connected with one of such sprocket-wheels at all times adapted to be connected to and disconnected from the other sprocket-wheel, means for moving either of such splined friction gear members into engagement with the adjacent independently rotatable friction-clutch member as desired, a pin clutch for connecting the reduction-gear mechanism with one of such sprocket-wheels and disconnecting it therefrom, and means for operating such pin-clutch, substantially as described.

8. In a mechanism of the class described, the combination of a main driving-shaft, a pair of sprocket-wheels mounted upon and rotatable with relation to such driving-shaft, a friction clutch member connected to each of such sprocket-wheels and rotatable independently of each other, friction clutch mechanism splined to the driving-shaft and movable into and out of engagement with either of such independently-rotatable friction clutch members as desired, reducing-gear mechanism connected with one of such sprocket-wheels at all times and adapted to be connected to and disconnected from the other sprocket-wheel, means for moving either of such splined friction clutch members into engagement with the adjacent independently-rotatable friction clutch member as desired, a pin-clutch for connecting the reduction gear mechanism to one of such sprocket-wheels and disconnecting it therefrom, and means for operating the splined clutch members and simultaneously automatically operating the pin-clutch, substantially as described.

9. In a mechanism of the class described, the combination of a main driving-shaft, a pair of sprocket-wheels mounted upon and rotatable with relation to such driving-shaft, a friction clutch member connected to each of such sprocket-wheels and rotatable independently of each other when desired, reducing-gear mechanism connected with one of such sprocket-wheels at all times and adapted to be connected to and disconnected from the other sprocket-wheel, a pair of friction clutch members splined to the driving-shaft and movable into and out of engagement with either of such independently-rotatable friction clutch members as desired, a sliding block mounted intermediate the splined clutch members, means for connecting such splined clutch members and permitting their rotation on opposite sides of such sliding block, an operating-rod provided with a loop in sliding engagement with such sliding block and having a diagonal slot in each side of such loop, a pin mounted upon each side of the sliding block in engagement with one of such diagonal slots, and means for automatically connecting such reducing-gear mechanism with one of such sprocket-wheels and disconnecting it therefrom as desired, substantially as described.

10. In a mechanism of the class described, the combination of a main driving-shaft, a pair of sprocket-wheels mounted upon and rotatable with relation to such driving-shaft, a friction clutch member connected to each of such sprocket-wheels and rotatable independently of each other when desired, friction clutch mechanism splined to the driving-shaft and movable into and out of engagement with either of such independently-rotatable friction clutch members as desired, reducing-gear mechanism connected with one of such sprocket-wheels at all times and adapted to be connected to and disconnected from the other sprocket-wheel, means for connecting the last-mentioned sprocket-wheel with the reduction-gear mechanism and disconnecting it therefrom, a fly-wheel mounted upon such main driving-shaft rotatable therewith and provided upon one side with a friction-surface, a friction-wheel mounted adjacent to and rotatable independently of such fly-wheel and connected with one of such sprocket-wheels, and means for operatively connecting such friction-wheel and fly-wheels, substantially as described.

11. In a mechanism of the class described, the combination of a main driving-shaft, a pair of sprocket-wheels mounted upon and rotatable with relation to such driving-shaft, a friction-clutch member connected to each of such sprocket-wheels and rotatable independently of each other when desired, friction clutch mechanism splined to the driving-shaft and movable into and out of engagement with either of such independently-rotatable friction clutch members as desired, reducing-gear mechanism connected with one of such sprocket-wheels at all times and adapted to be connected to and disconnected from the other sprocket-wheel, means for connecting the last-mentioned sprocket-wheel with the reduction-gear mechanism and disconnecting it therefrom, a fly-wheel mounted upon such main driving-shaft rotatable therewith and provided upon one side with a friction-surface, a friction-wheel mounted adjacent to and rotatable independently of such fly-wheel and connected with one of such sprocket-wheels, a slotted friction-wheel movable into and out of engagement with the last-mentioned friction-wheel and fly-wheel for causing such parts to rotate in opposite directions, and means for operating such slotted friction-wheel, substantially as described.

12. In a mechanism of the class described, the combination of a main driving-shaft, a pair of sprocket-wheels mounted upon and rotatable with relation to such driving-shaft, a friction clutch member connected to each of such sprocket-wheels and rotatable therewith, reducing-gear mechanism connected with one of such sprocket-wheels at all times and adapted to be connected to and disconnected from the other sprocket-wheel, clutch mechanism for connecting such reduction-gear mechanism with the last-named sprocket-wheel and disconnecting it therefrom, two friction-clutch members splined to the driving-shaft between the friction clutch members of the sprocket-wheels, a sliding block mounted upon the shaft between such splined friction clutch members rotatable with relation to the shaft and slidable longitudinally thereof, and an operating-rod provided with a looped portion in sliding engagement with such sliding block for moving the sliding block and thereby the splined friction clutch members in the desired direction longitudinally of the shaft whereby when the operating-rod is moved in one direction the reduction-gear mechanism is thrown into operative connection with the driving-shaft and driving-wheels of the vehicle and when such operating-rod is moved in the opposite direction such reduction-gear mechanism is thrown out of operative connection with the driving-shaft and driving-wheels of the vehicle and such driving-shaft and driving-wheels are operatively connected independently of such reduction-gear mechanism, substantially as described.

JOHN O. HOBBS.

Witnesses:
   THOMAS F. SHERIDAN,
   ANNIE C. COURTENAY.